United States Patent
Kimura

(10) Patent No.: US 11,790,579 B2
(45) Date of Patent: Oct. 17, 2023

(54) PRODUCTION EFFICIENCY IMPROVEMENT ASSISTING SYSTEM

(71) Applicant: iSmart Technologies Corporation, Aichi (JP)

(72) Inventor: Tetsuya Kimura, Aichi (JP)

(73) Assignee: iSmart Technologies Corporation, Aichi (JP)

( * ) Notice: Subject to any disclaimer, the term of this patent is extended or adjusted under 35 U.S.C. 154(b) by 95 days.

(21) Appl. No.: 17/493,357

(22) Filed: Oct. 4, 2021

(65) Prior Publication Data

US 2022/0026888 A1 Jan. 27, 2022

Related U.S. Application Data

(63) Continuation of application No. PCT/JP2020/014018, filed on Mar. 27, 2020.

(30) Foreign Application Priority Data

Apr. 5, 2019 (JP) .................... 2019-072908

(51) Int. Cl.
*G06T 11/20* (2006.01)
*G05B 19/418* (2006.01)

(52) U.S. Cl.
CPC ...... *G06T 11/206* (2013.01); *G05B 19/41865* (2013.01); *G05B 2219/50185* (2013.01); *G06T 2200/24* (2013.01)

(58) Field of Classification Search
CPC .... G05B 19/41865; G05B 2219/50185; G06T 11/206
See application file for complete search history.

(56) References Cited

U.S. PATENT DOCUMENTS

2007/0090178 A1 4/2007 Fujii et al.
2010/0214300 A1* 8/2010 Alsbury ............... G06T 11/206
345/440.2
2018/0052452 A1* 2/2018 Kimura ............ G05B 19/41865

FOREIGN PATENT DOCUMENTS

JP 2003-337621 11/2003
JP 2004-280324 10/2004
(Continued)

OTHER PUBLICATIONS

Habraken, Joe, "Microsoft Office 2010 in Depth", Que Publishing, 2011, p. 381-414. (Year: 2011).*

(Continued)

*Primary Examiner* — Michelle L Sams
(74) *Attorney, Agent, or Firm* — Beyer Law Group LLP

(57) ABSTRACT

A production efficiency improvement support system calculates a cycle time erc. based on results of detecting an operating status of production equipment, and displays a chart showing a time series variation of the cycle time etc. The cycle time is displayed such that a variation of the cycle time is visually recognizable. The chart displays information regarding a production volume that is the most important variable in production management on a first row and a second row from the top, and displays information regarding the operating status of the production equipment related to the production volume on bottom two rows (a fourth row and a fifth row). The chart also displays the operating status of the production equipment between these pieces of information. Displaying these indexes in the form of a chart facilitates visual recognition of how to improve the cycle time and effectively supports improvement of the production efficiency.

14 Claims, 10 Drawing Sheets

(56) References Cited

FOREIGN PATENT DOCUMENTS

| JP | 2007-141208 | 6/2007 |
| JP | 2018-32396 | 3/2018 |
| JP | 2018-185653 | 11/2018 |

OTHER PUBLICATIONS

International Search Report from International Application No. PCT/JP2020/014018 dated Jun. 16, 2020.

\* cited by examiner

PRODUCTION EFFICIENCY IMPROVEMENT ASSISTING SYSTEM

CLAIM OF PRIORITY

This application is a Continuation of International Application No. PCT/JP2020/014018 filed on Mar. 27, 2020, which claims benefit of Japanese Patent Application No. 2019-072908 filed on Apr. 5, 2019. The entire contents of each application noted above are hereby incorporated by reference.

BACKGROUND OF THE INVENTION

1. Field of the Invention

The present disclosure relates to a production efficiency improvement support system configured to support improvement of production efficiency in production equipment used to produce a product.

2. Description of the Related Art

With regard to production equipment used to produce a product, it is required to improve the efficiency of production of the product, i.e., the production efficiency, and it is also required to recognize the current production efficiency as its premise. For the purpose of objectively recognizing the operating status of the production equipment, the recent attempts have mounted a variety of sensors to the production equipment to detect their operating conditions.

For example, Japanese Laid-Open Publication No. 2018-32396A discloses a production management system configured to detect an operating status of production equipment by detectors, such as an optical sensor and an acoustic sensor, externally attached to the production equipment and to manage results of detection by a management device. In this disclosure, a list of cycle time in times series is displayed as its output example.

Japanese Laid-Open Publication No. 2018-185653A discloses a technique of obtaining statistical values of cycle time based on detection signals detected from production equipment and determining an actual cycle time by using the statistical values. In this disclosure, a chart with operational availability (also referred to as operation rate or utilization rate) as ordinate and cycle time as abscissa is displayed as its output example.

SUMMARY OF THE INVENTION

It has conventionally been known that the cycle time is a useful index indicating the operating status of production equipment. It has, however, been found that simple recognition of the cycle time from a macro viewpoint, for example, in the unit of one day, is insufficient to improve the production efficiency. For example, when the cycle time is varied unstably in an operation time of one day, there should be some reason for this unstable variation. There is accordingly still a room for improvement of the production efficiency. For improvement of the production efficiency, it is thus necessary to analyze the cause of a decrease in production efficiency. For this purpose, it has been desired to recognize the varying situation of the cycle time.

By taking into account the problems described above, an object of the present disclosure is to output useful indexes with a view to improving production efficiency in production equipment and thereby support the improvement.

According to one aspect of the present disclosure, there is provided a production efficiency improvement support system configured to support improvement of production efficiency in production equipment used to produce a product. The production efficiency improvement support system comprises a production management index calculator configured to calculate a cycle time that is a time period required for production of the product, multiple number of times during operation of the production equipment, based on results of detection obtained by detecting an operating status of the production equipment; and a display controller configured to display a chart showing a time series variation of the calculated cycle time in such a state that a variation of the calculated cycle time is visually recognizable.

In this specification, the production efficiency means the number of products produced per hour, i.e., the output per hour. The cycle time means a time period required for producing one product. The cycle time may be obtained, for example, by measuring a time interval when a product is output from production equipment (the cycle time thus obtained is hereinafter referred to as "measured cycle time"). The cycle time may alternatively be calculated by (operable time−downtime)/production number in the same time period (sec) of the production equipment. The operable time herein means a time period when the production equipment is supposed to operate and is, for example, a time period calculated by subtracting production downtimes such as a lunch break from the operating hours.

This aspect of the present disclosure displays a time series change of the obtained cycle time in a chart. The chart may show the time and the cycle time as two axes or may display a change of the cycle time in the form of a moving picture.

This aspect of the present disclosure performs display in such a form as to enable a variation of the cycle time to be visually recognized. For example, when a sufficient number of cycle times are obtained, these results of detection may be simply plotted by symbols. Another procedure may employ a form that shows a variation range of the cycle times obtained at respective times by a line segment, i.e., a form like a Candlestick chart of stock prices. Another procedure may display a curve connecting upper limit values of the cycle time and a curve connecting lower limit values of the cycle time or may display a range of a lower limit value to an upper limit value by color coding according to the density.

The display according to this aspect of the present disclosure enables a variation of the cycle time to be recognized with high accuracy and facilitates examination of countermeasures for improving the production efficiency. For example, an unstable variation or a significant variation of the cycle time is generally attributable to some cause at the time of such a variation. Seeking this cause results in improving the production efficiency. As described above, this aspect of the present disclosure performs display in such a state that a variation of the cycle time is recognizable and thereby provides useful information for improving the production efficiency.

In the production efficiency improvement support system of the above aspect, the display controller may display the calculated cycle time by a symbol.

As a result of the inventor's trial of various displays, the inventors have found that the configuration of this aspect assures the easiest visual recognition of a variation. The symbol may be set arbitrarily, for example, a point or a figure. The chart is displayed in such a form that the symbol is densely located or is scattered. A variation of the cycle time is objectively recognizable by the density of the symbol.

In the production efficiency improvement support system of the above aspect, the production management index calculator may calculate an actual cycle time as a representative value of a plurality of the cycle times by statistical processing, and the display controller may additionally display the actual cycle time in the chart.

The configuration of this aspect enables the degree of a variation of the cycle time to be visually recognized relative to the actual cycle time as a criterion. As described above, it is important to recognize the variation of the cycle time, with a view to improving the production efficiency. The configuration of displaying the representative value indicating the entirety of the results of detection like this aspect enables the variation to be recognized more objectively.

The representative value adopted may be a mode value, an average value or a median value of the detected cycle time. It is more preferable to calculate the average value after exclusion of cycle times determined as abnormal values from the detected cycle times. A method employable to exclude the abnormal values may specify only cycle times of not larger than a predetermined reference value as normal values. Another employable method may exclude a predetermined number of cycle times in a descending order from the maximum value and also exclude a predetermined number of cycle times in an ascending order from the minimum value.

The actual cycle time may be displayed in any of various methods. For example, the actual cycle time may be displayed by a symbol having a different size, a different color or a different shape from that of the symbol used for the cycle time. A time series variation of the actual cycle time may be displayed by a polygonal line graph.

In the production efficiency improvement support system of the above aspect, the production management index calculator may further calculate an operational availability that is a ratio of time during which the production equipment is operating and a production volume of the product, multiple number of times during operation of the production equipment, based on the results of detection obtained by detecting the operating status of the production equipment; and the display controller may display a time series variation of the operational availability and a time series variation of the production volume, as well as the time series variation of the cycle time to be aligned against an identical time axis in the chart.

The operational availability means a ratio of time during which the production equipment is operating and may be calculated by any of various methods. For example, the operational availability may be calculated by a method of integrating the measured cycle times determined as normal to determine an operating time that is a time period when the production equipment actually operates and dividing the operating time by the required time that is a time period required for operation of the production equipment, i.e., operating time/required time×100(%). The measured cycle time determined as normal may be limited to measured cycle times of not greater than a predetermined reference value that is set to be, for example, double a mean value, among the actually measured cycle times. The measured cycle time determined as normal may alternatively be obtained by a method of detecting signal outputs indicating normality or abnormality from the production equipment and measuring a cycle time during a time period when a normality signal is output or during a time period when no abnormality signal is output.

The operational availability may also be calculated by using an operating time that is determined from a mean value of the measured cycle time×production volume. In this case, the mean value of the measured cycle time may be determined by limitation to measured cycle times of not greater than a predetermined reference value.

The operational availability may also be calculated by (operable time−downtime)/operable time×100(%). In this case, (operable time−downtime) may be calculated by a method of detecting signal outputs indicating normality or abnormality from the production equipment and integrating an output time of normality or may be calculated by a method of integrating an output time of abnormality and subtracting the integrated output time from the operable time. The operational availability may be determined by (required time per one product×required number)/actual required time×100(%). The actual required time herein means a time period actually required to produce a required number of products.

In the production efficiency improvement support system of the above aspect, the display controller may display a time series variation of an accumulated number of the products and a production output with regard to each of predetermined time duration groups in an identical chart, as the production volume.

The production output means the number of products produced per unit time. Time duration groups used for calculation of the production output may be set arbitrarily and may not necessarily have fixed durations. The accumulated number of the products and the production output are production indexes correlated to each other. For example, when the accumulated number of the products is shown by a polygonal line graph, the production output at each time is recognizable from the slope of the polygonal line graph. Using only a chart showing the accumulated number of the products, however, has some difficulty in intuitively recognizing a change of the accumulated number and has significant difficulty in recognizing a change of the production output (a variation in a time change of the accumulated number of the products). The configuration of the above aspect, on the other hand, displays the accumulated number of the products and the production output in one identical chart. This configuration enables a change rate of the accumulated number of the products to be readily and intuitively recognized and also enables a change of the production output to be recognized. This aspect accordingly provides the chart that allows for comprehensive recognition of a change in the production volume.

The form of the chart may be set freely. Displaying the accumulated number of the products and the production output in different forms, for example, displaying the accumulated number of the products by a polygonal line graph and the production output by a histogram, however, provides a more readily recognizable chart.

According to one preferable aspect of the production efficiency improvement support system configured to display the production volume, the operational availability and the cycle time, the display controller may display the chart in such an arrangement that the production volume is placed on an upper side of the chart and the operational availability and the cycle time are placed on a lower side of the chart.

The configuration of this aspect displays the results of operation on the upper side and the indexes related to the results of operation on the lower side. The display in this layout has such an advantage as to allow for relatively easy comparison between the results and the cause and to readily understand the cause of non-achievement of target results.

There is no limitation in the sequence of the operational availability and the cycle time in the vertical layout, but it is preferable to display the cycle time on the lower side. The cycle time is likely to have a larger variation than that of the operational availability. Displaying a chart having a larger variation on the lower side reduces the feeling of dissipation in the entire display screen and advantageously enables the displayed information to be organized for the easier recognition.

In the production efficiency improvement support system configured to display the production volume, the operational availability and the cycle time, the display controller may display information showing whether the production equipment is in operation or not in operation at each time, to be placed between the production volume and the operational availability with the cycle time, in the chart.

The configuration of this aspect enables the variations of the production volume, the operational availability and the cycle time to be checked with comparison with the state of operation or non-operation of the production equipment. This configuration advantageously enables the cause of the variation to be readily determined. The information showing whether the production equipment is in operation or not in operation may be displayed in any of various methods. For example, one method may use a so-called Gantt chart to show the operating status of the production equipment in the form of a band of respective time zones. This chart may show work processes in parallel. It is, however, preferable to display in the form of a band graph, in order to allow for easy recognition of whether the production equipment is in operation or not in operation. In place of using the Gantt chart, another available method may display power consumption of the production equipment or any of various other parameters showing the in-operation state of the production equipment, in the form of a polygonal line graph or a bar graph.

In the production efficiency improvement support system of the above aspect, whether a time series change of the operational availability and a time series change of the production volume are displayed or not, the production management index calculator may further display a time series variation of an operational availability that is a ratio of time during which the production equipment is operating and a time series variation of a production output ratio that is a ratio of an actual production output to an expected production output, in an identical chart, based on the results of detection obtained by detecting the operating status of the production equipment.

The production output means the number of products produced per unit time. The operational availability and the cycle cost in the production equipment are varied, so that the production output as the actual value is also varied. The production output ratio is a ratio of a production output as an actual value to an expected production output achieved by the cycle time and the operational availability as expected, i.e., an index calculated by (production output as actual value)/expected output production×100(%). Even in the state of a high operational availability, the large cycle time provides the low production output ratio. Even in the state of a low operational availability, on the contrary, the small cycle time provides the high production output ratio. Accordingly, the production output ratio serves as an index for comprehensively evaluating the operational availability and the cycle time.

The configuration of this aspect displays the time series change of the production output ratio and the time series change of the operational availability in an identical chart. This assures intuitive comparison between the production output ratio and the operational availability. For example, the low production output ratio relative to the operational availability suggests a problem of the cycle time. Accordingly, using the chart of this aspect has such an advantage as to readily determine whether the expected cycle time is achieved or not.

In order to utilize this advantage more effectively, a mean value of the cycle time or the actual cycle time may additionally be displayed in the chart of the time series change of the cycle time.

In the production efficiency improvement support system of the above aspect, in response to specification of any point in the chart by an operation of a pointing device, the display controller may open a pop-up window to display detailed information on the operating status corresponding to the specified point.

The configuration of this aspect provides a simple display of the chart to allow for easy recognition of the entire chart and additionally enables the detailed information to be obtained relatively readily as needed basis.

The detailed information may be displayed in a sub-window provided, for example, beside the chart. Using the pop-up window like the above aspect, however, has such an advantage that the operator promptly checks information regarding a desired location without shifting the visual line.

In the production efficiency improvement support system of the above aspect, the display controller may highlight any cycle time determined as abnormal.

The configuration of this aspect facilitates visual recognition of any location having abnormality in the chart. Highlighting may use a color, a size, or a shape of a symbol that allows for easier visual recognition.

Each cycle time having a difference of not smaller than a predetermined value or of not lower than a predetermined ratio from a reference value, such as the actual cycle time, may be determined as abnormal. Another available procedure may determine whether each cycle time is abnormal or normal by statistically processing a variation of the cycle time and multiplying a standard deviation by a predetermined factor. Another available procedure may determine any cycle time that is out of an upper limit value and a lower limit value set in advance.

According to another aspect of the present disclosure, there is provided a production efficiency improvement support system configured to support improvement of production efficiency in production equipment used to produce a product. The production efficiency improvement support system comprises a production management index calculator configured to refer to results of detection obtained by detecting an operating status of the production equipment including downtimes of the production equipment and calculate an accumulated downtime with regard to each of a plurality of downtime duration groups, which are set in advance according to duration of the downtime; and a display controller configured to display a chart showing the accumulated downtime with regard to each of the downtime duration groups.

In order to improve the production efficiency, it is preferable to eliminate the cause of stopping the production equipment. For this purpose, a generally preferential procedure specifies the cause of an event of long downtime and eliminates the cause. Detection of the real operating status, however, suggests the possibility of an accumulated long downtime caused by frequent short-time stops.

The configuration of the above aspect displays the accumulated downtime with regard to each downtime duration group in the chart and thereby enables the downtime duration group having the high accumulated downtime to be readily recognized. Eliminating the causes of the stops in this downtime duration group effectively reduces the downtime of the production equipment and improves the production efficiency.

The downtime duration group of the above aspect may be set arbitrarily, for example, 0 to A minutes and A to B minutes. The durations of the respective downtime duration groups are not necessarily identical with each other. It is not necessary that the downtime duration group is unequivocally mapped to the cause of the stop. Setting the downtime duration group to be mapped to the cause of the stop is, however, advantageous to relatively readily find a countermeasure.

It is not necessary that the respective aspects of the present disclosure are provided with all the various features described above, but part of such features may appropriately be omitted or be provided in combination with other features.

The present disclosure is not limited to the configuration of the production efficiency improvement support system but may be configured as a production efficiency improvement support method that causes a computer to perform each of the displays described above and thereby support improvement of the production efficiency. The present disclosure may also be configured as a computer program that causes a computer to support improvement of production efficiency. The present disclosure may further be configured as a computer readable recording medium in which such a computer program is recorded.

DESCRIPTION OF THE EMBODIMENTS

A. System Configuration

Figure 1:
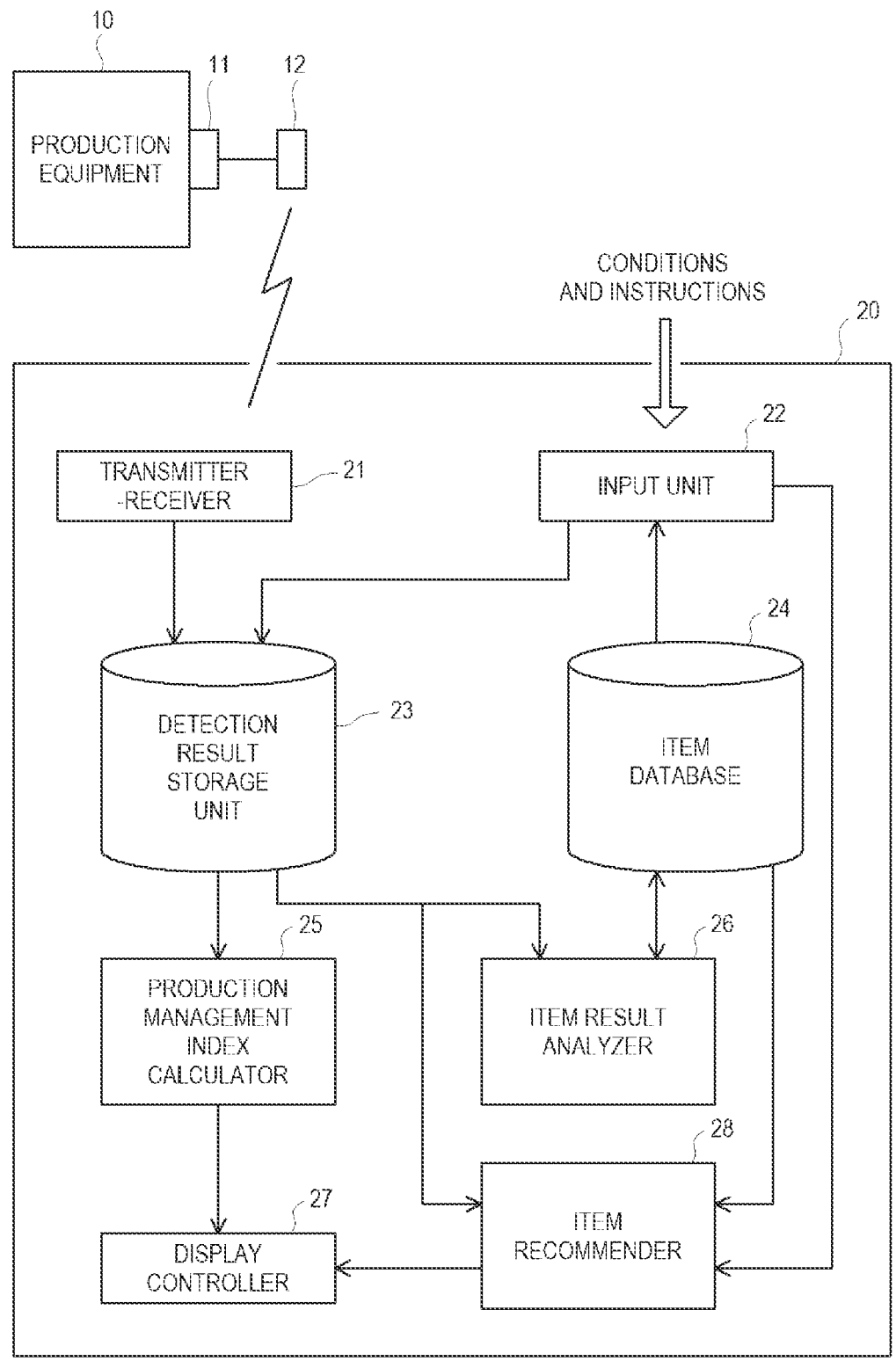
FIG. 1 is an explanatory diagram illustrating the configuration of a production efficiency improvement support system.

FIG. 1 is an explanatory diagram illustrating the configuration of a production efficiency improvement support system. This system recognizes the operating status of production equipment in a factory and visually display the recognized operating status, so as to support countermeasures taken to improve the production efficiency.

Production equipment 10 may be any apparatus configured to produce a product. The production equipment 10 is illustrated as a single apparatus in FIG. 1 but may be a production line or may be a plurality of apparatuses or a plurality of production lines.

Sensors 11 are configured to detect the operating status of the production equipment 10. It is preferable that the sensors 11 are externally attached to the production equipment 10, although this configuration is not essential. The sensors 11 provided include, for example, a sensor of detecting a pulse output every time a product is completed and a sensor of detecting whether the production equipment 10 is in operation or at stop. For example, a configuration that includes a light source located at a position where a completed product passes through and a light receiving element provided to receive the light from this light source and that detects the light blocked every time the product passes through may be used as one of the sensors 11. An optical sensor, an acoustic sensor, a thermal sensor, a current sensor, a distance sensor, an atmospheric pressure sensor, an acceleration sensor, a rotation speed sensor, a humidity sensor, a pressure sensor and the like configured to detect the light, the sound, the vibration and other pieces of information generated in the production equipment 10 in operation or at stop may also be used for the sensors 11. Sensors of detecting signals intrinsically outputting in the production equipment 10 may also be used for the sensors 11.

A transmission device 12 is configured to send various signals detected by the sensors 11 to a production efficiency improvement support system 20. The transmission may be wired transmission or wireless transmission. The timing of transmission may be any of various settings. For example, the timing of transmission may be at the time when signals are detected by the respective sensors 11 or may be at the time when a predetermined amount of signals is accumulated.

The production efficiency improvement support system 20 is a system configured to receive the signals from the sensors 11 and output information useful for improving the production efficiency. According to the embodiment, the production efficiency improvement support system 20 is configured as a software configuration by installing computer programs for implementing a variety of illustrated functional blocks into a computer provided with a CPU and memories. Part or the entirety of the functional blocks may, however, be configured as a hardware configuration. The production efficiency improvement support system 20 is not limited to a standalone configuration but may be configured as a distribution system including a plurality of servers and the like connected with each other via a network.

The respective functional blocks are described below.

A transmitter-receiver 21 is configured to send and receive signals to and from the transmission device 12.

A detection result storage unit 11 is configured to store the results of detection by the sensors 11. The contents and the structure of information stored will be described later.

An input unit 22 is configured to input a variety of conditions and instructions, based on, for example, the operator's operations of a keyboard, a mouse, a touch panel and the like. The conditions include, for example, the specification of the production equipment 10 to be subjected to the detection, and the contents that are likely to affect the results of the detection, for example, a countermeasure for improving the production efficiency, i.e., an item, applied to the production equipment 10. The conditions may also include description of, for example, the date and time, the location, and the name of the product. The instructions include target values of the production efficiency, the production output and the like. The input unit 22 may be configured to input the conditions and the instructions from another server or the like via the network, in addition to the operator's operations.

A production management index calculator 25 is configured to calculate production management indexes, based on the results of detection stored in the detection result storage unit 23. According to the embodiment, the production management index calculator 25 calculates, for example, an operational availability, a cycle time, a production output per hour, an accumulated production volume, an actual operational availability, an actual cycle time and a downtime. These production management indexes may be calculated in real time or may be calculated based on the results of past detection.

The actual operational availability and the actual cycle time are representative values obtained respectively by statistical processing of the operational availability and the cycle time. The representative value may be, for example, a mode value out of the results of calculation of the operational availability or the cycle time as the processing object or may be a mean value. The mean value may be calculated by excluding values determined as abnormal from the results of calculation.

The production output per hour is the number of products produced in a unit time and may be calculated by unit time/cycle time. Like the operational availability, the production output per hour may be calculated, based on the number of products produced in a certain time zone specified as a criterion. Every time the cycle time is calculated, the production output per hour may be calculated by unit time/cycle time.

The accumulated production volume is calculated by accumulation of the number of products produced in the past.

An item database 24 is a database configured to store information with regard to countermeasures for improving the production efficiency, i.e., items. The item database 24 stores the contents, a past record of application, and the like with regard to each item. The contents and their structure to be stored will be described later.

An item effect analyzer 26 is configured to refer to the past records and the conditions linked with the respective results of detection stored in the detection result storage unit 23 and to analyze the effect of application of an item on improvement of the operational availability, the cycle time and the like. For example, for the purpose of analyzing the effect of application of a certain item, past records having identical conditions other than application or non-application of the item are selected and are compared with each other. The effect of application of an item differs, depending on the conditions, for example, application of other items, and is thus analyzed in relation to application of the other items. The item effect analyzer 26 stores the results of the analysis into the item database 24.

An item recommender 28 is configured to recommend an item according to target values of the operational availability and the cycle time, in order to achieve these target values. As described above, the effect of application of each item is analyzed by the item effect analyzer 26 and is stored in the item database 24. The item recommender 28 refers to the item database 24 and selects an item that has the effect according to the target values.

The item effect analyzer 26 and the item recommender 28 may be configured by using an artificial intelligence. For example, the item effect analyzer 26 may use the artificial intelligence and learn the effect of application of an item by machine learning. This configuration uses the past records stored in the detection result storage unit 23 as learning data and performs regression analysis with each item in the item database 24 as an explanatory variable and the results of the operational availability and the cycle time stored in the detection result storage unit 23 as objective variables. The item recommender 28 accordingly specifies an item according to a target operational availability and a target cycle time by taking advantage of a learning model thus obtained.

A display controller 27 is configured to generate display data to display a variety of screens for supporting improvement of the production efficiency and display the generated display data on a display. The display is not necessarily a display directly connected with the production efficiency improvement support system 20 but may be a screen of a computer connected with the production efficiency improvement support system 20 via a network. According to the embodiment, a chart indicating a relationship between the operational availability and the cycle time is displayed as a display screen. The display controller 27 also serves to display an item recommended for improvement of the production efficiency.

Figure 2:
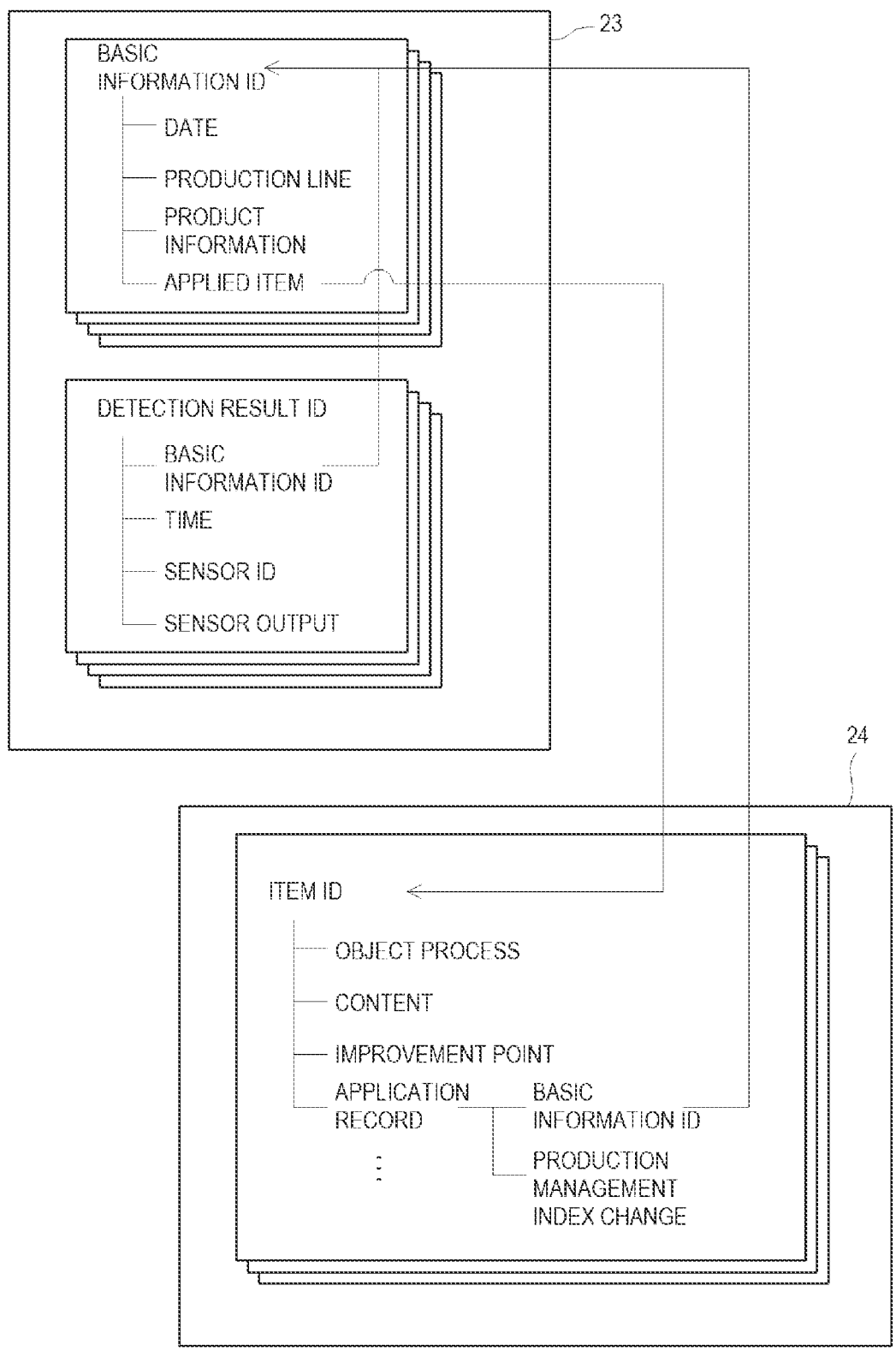
FIG. 2 is an explanatory diagram illustrating the structure of databases.

FIG. 2 is an explanatory diagram illustrating the structure of databases. The contents and the structure of data stored in the detection result storage unit 23 and stored in the item database 24 are illustrated. FIG. 2 illustrates only one example of these databases, and the contents and the structure are not limited to those described herein.

An upper left of the drawing illustrates the data structure of the detection result storage unit 23. The storage of the detection result storage unit is roughly classified into basic information and results of detection, which are linked with each other. "Basic Information ID" denotes unique identification information allocated to each record of the basic information. "Date" denotes information of the year, the month and the date of production. "Production Line" denotes information for identifying a production line that is an object of detection of the operating condition and may be, for example, the name of the production line or a code allocated to the production line. "Product Information" denotes information for identifying a product produced in the production line and may be, for example, the name or a product number. "Applied Item" denotes information for identifying the type of an item applied to the production line for improvement of the production efficiency. According to the embodiment, the contents and the like of each item are stored with identification information, i.e., an item ID, in the item database 24. The item ID is accordingly stored as the "applied item". These pieces of information provide the basic facts showing under which conditions the results of detection are obtained. In the case of application of a plurality of items, a plurality of item IDs are stored as "Applied Item". The basic information may further include many other pieces of information, in addition to the information illustrated above.

The information obtained from the production equipment 10 is continuously stored as the results of detection. "Detection Result ID" denotes unique identification information allocated to each record of the results of detection. "Basic Information ID" denotes information that links the results of detection with basic information. The basic information, for example, the date and the production line, linked with each result of detection is obtained by referring to the basic information based on the basic information ID. "Time" denotes a time when each result of detection is obtained. "Sensor ID" denotes identification information for identifying the sensor 11 used for the detection. "Sensor Output" denotes a result detected by the sensor 11.

According to the embodiment, in the case where multiple pieces of information are obtained from a plurality of sensors 11 at the same time, individual records having individual detection result IDs allocated to these multiple pieces of information and including different sensor IDs and sensor outputs are created. For example, in the case of obtaining a measured cycle time based on the results of detection, records of a sensor ID allocated to a sensor configured to detect completion of each product are extracted from the results of detection, and a time interval of the respective sensor outputs is determined. Similarly, in the case of calculating another production management index, the corresponding outputs are extracted from the results of detection and are used for calculation.

The results of detection are not limited to the contents or the structure illustrated in FIG. 2. For example, records may be created on the basis of time.

In another example, at the time when information is obtained, the obtained information may be classified into information for calculating the operational availability and information for calculating the cycle time. The classified groups of information may be stored individually in time series. This configuration has such advantages as the simplified process of calculating the production management indexes, for example, the operational availability and the cycle time, and the resulting reduction of the processing load.

A lower right of the drawing illustrates the data structure of the item database 24. The items mean countermeasures taken to improve the production efficiency. The countermeasures include countermeasures that do not require direct modification of the production equipment itself, for example, changing the position of a quality check table to the closer position and placing a step ladder to provide a pathway beside a machine, and countermeasures that modify the production equipment, for example, extending a hose of an air gun and attaching a cover for protection from the scattering of machining dust. The countermeasures may also include changing the work process and changing the materials or the tools to be used.

The item database 24 is a database configured to store the past records of application of these items. "Item ID" denotes unique identification information allocated to a past record of application of each item. "Object Process" denotes a process into which the item is classified, based on its purpose and the like. For example, the object process shows which operation process, such as "quality checking" or "replacement of the cutting edge", the item is applied to, for the purpose of improvement. The object process may be set freely and may be set, for example, based on the type of the production equipment which the item is applied to. "Contents" denote the description of the details of the item in natural language, for example, "changing the position of the quality check table to the closer position". "Improvement Point" denotes the description of the effect of improvement by each item in natural language, for example, "stable work by reduction of fatigue". These are basic information of the item corresponding to the "Item ID".

The item database 24 stores a plurality of past records of application of each item as "Application Record". "Application Record" includes storage of "Basic Information ID" and "Production Management Index Change". The basic information ID links each application record with the basic information in the detection result storage unit 23 and thereby enables, for example, the date and the production line to which each item is applied, to be specified. "Production Management Index Change" stores the effect by application of the item or more specifically, changes in the production management indexes, such as operational availability and the cycle time before and after application of the item. The production management index change is obtained by comparison between the results of detection before and after application of the item as described above. "Basic Information ID" accordingly stores two or more basic information IDs used for such comparison.

B. Output Example of Charts

Figure 3:
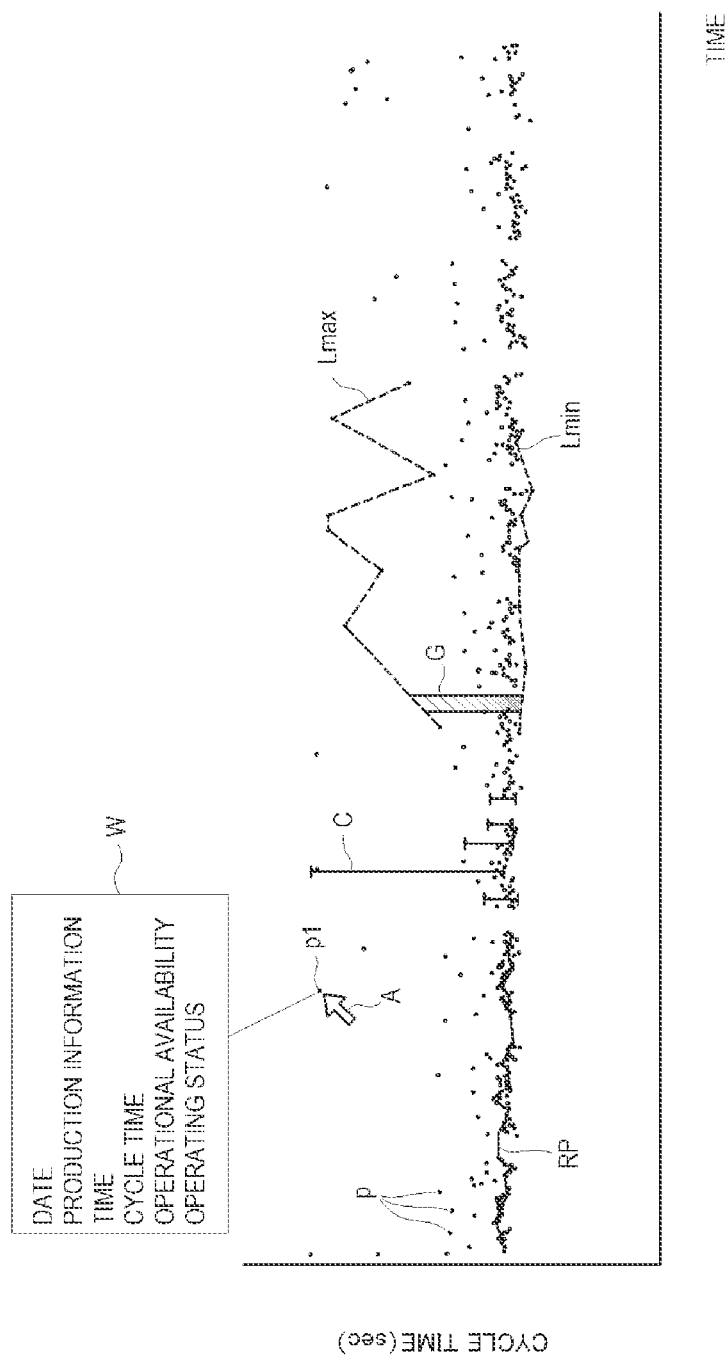
FIG. 3 is an explanatory diagram illustrating an output example of a chart with regard to a cycle time.

FIG. 3 is an explanatory diagram illustrating an output example of a chart with regard to the cycle time. This shows an example of a screen displayed by the production efficiency improvement support system 20, based on the results of detection from the production equipment 10.

This chart shows the time as abscissa and the cycle time as ordinate. As illustrated, the results of detection of the cycle time at the respective times are shown by symbols like points p. Displaying the cycle time by the symbol facilitates visual recognition of a variation of the cycle time.

A variation in an actual cycle time RP is also displayed in the chart. This configuration enables the degree of a variation of the cycle time (the points p) to be recognized relative to the actual cycle time RP as the criterion.

The chart is, however, not limited to this configuration but may also display a variation range of the cycle time as shown by a line segment C. Only a single value of the cycle time is obtained at each time, and the line segment C in the chart displays a variation range of the cycle time in a predetermined duration. Such display facilitates visual recognition of the variation range of the cycle time. The actual cycle time may be additionally displayed in the display mode like the line segment C.

The display mode of the chart may be configured to additionally show a polygonal line Lmax connecting upper limit values of the cycle time and a polygonal line Lmin connecting lower limit values of the cycle time. A variation of the cycle time between these polygonal lines may also be displayed by gradation according to the density of the variation as shown by a zone G. The gradation may be shown like the zone G or may be continuously shown in an entire area between the polygonal lines Lmax and Lmin.

In the illustrated example, the symbols of the cycle time (the points p) are displayed along with the line segment C and the polygonal lines Lmax and Lmin. The display of the symbols may, however, be omitted. It is not necessary to use all the display of the symbols (the points p), the display of the line segment C and the display of the polygonal lines Lmax and Lmin, but any one of these displays may be selectively used. These displays may be switched over in response to an operator's instruction.

In the chart, when any symbol p1 is specified with a pointing device like an arrow A, a pop-up window W is opened to display the detailed information regarding the point p1. In the illustrated example, pieces of information, i.e., the date, the product information, the time, the cycle time, the operational availability and the operating status, are displayed. Other pieces of information may be displayed. This configuration provides a simple display of the chart and enables the detailed information to be obtained as needed basis. The pop-up window is opened at a position near to the point specified with the pointing device. This configuration enables the operator to check the information without shifting the visual line and thus advantageously facilitates the operator's understanding of the detailed information.

Figure 4:
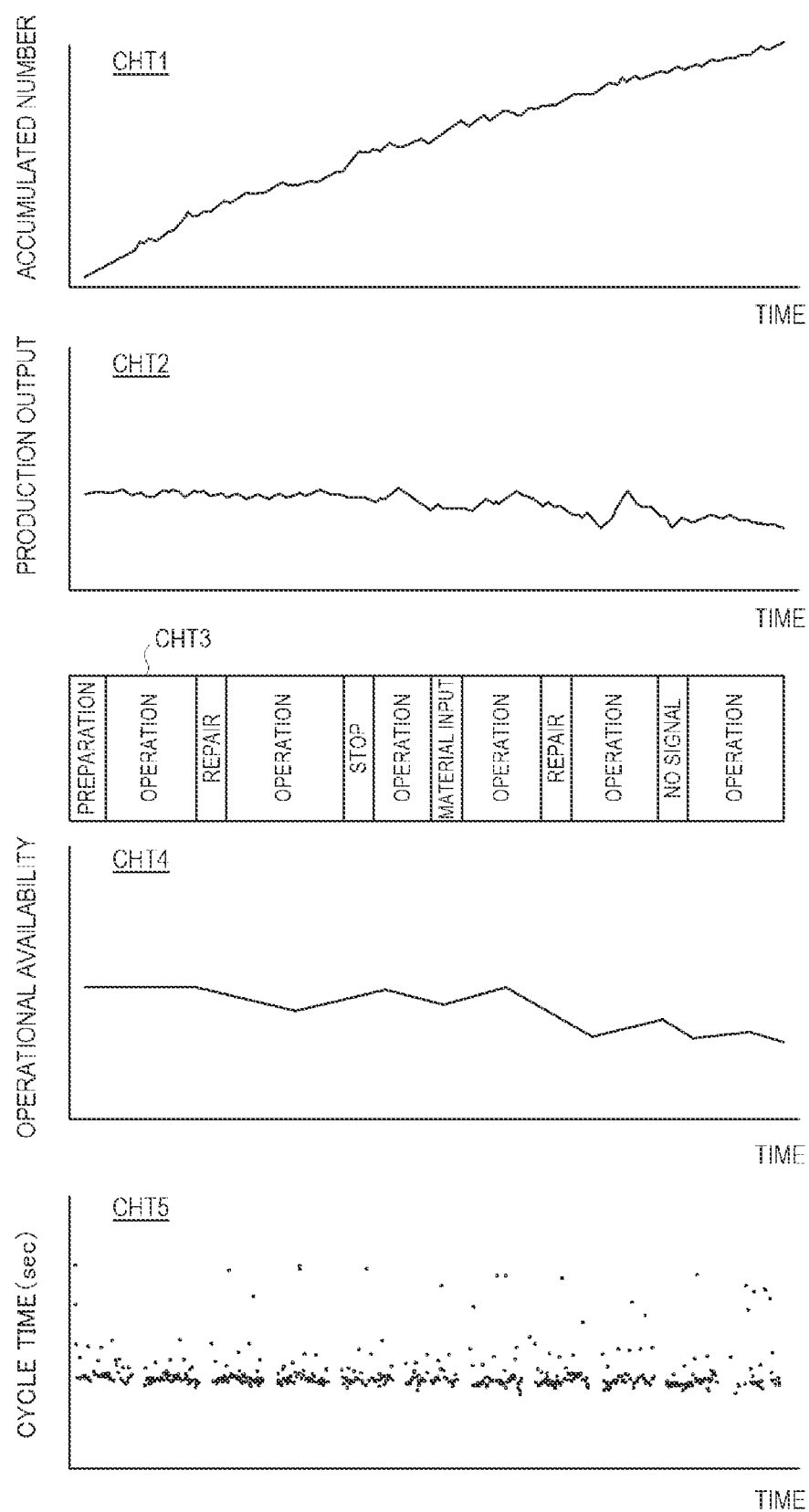
FIG. 4 is an explanatory diagram illustrating an output example of charts.

FIG. 4 is an explanatory diagram illustrating an output example of charts. FIG. 4 illustrates the image of all charts displayed on the screen.

A chart CHT1 on a first row from the top shows a time series variation of the accumulated number. The accumulated number is a graph increasing with elapse of time. A chart CHT2 on a second row shows a time series variation of the production output per unit time. A chart CHT3 on a third row is a Gantt chart showing the operating status of the production equipment at each time. The illustrated example has divisions of "preparation", "operation", "repair", "stop", "material input", and "no signal" (it is unknown whether the production equipment is in operation or not in operation). In the divisions other than "operation", the production equipment is recognized as non-operating status. The operating status may be divided into more detailed subdivisions or may be divided in only two divisions, "in operation" and "not in operation". A chart CH4 on a fourth row shows a time series variation of the operational availability. A chart CH5 on a fifth row shows a time series variation of the cycle time. The chart described in FIG. 3 is displayed here. Only the symbols are displayed in FIG. 4.

These charts CT1 to CT5 are displayed to be aligned against an identical time axis. This configuration allows for comparison among the accumulated number, the production output, the operating status, the operational availability and the cycle time at each time. As a result, for example, when a target production output is not achieved, this configuration has such an advantage as to readily analyze the cause of the failure, for example, the low operational availability or the long cycle time. For the purpose of further facilitating the comparison, a vertical line pass through all the charts may be displayed at a time specified with the pointing device.

As described above, the chart according to this embodiment displays the information regarding the production volume that is the most important variable in production management on the first row and the second row from the top, and displays the information regarding the operating status of the production equipment related to the production volume on the bottom two rows (the fourth row and the fifth row). The chart also displays the operating status of the production equipment between these pieces of information. The display in this sequence has such an advantage as to allow for relatively easy comparison between the results and the cause and to readily understand the cause of non-achievement of target results. There is no limitation in the sequence of the operational availability and the cycle time in the vertical layout, but it is preferable to display the cycle time on the lower side. The cycle time is likely to have a larger variation than that of the operational availability. Displaying a chart having a larger variation on the lower side reduces the feeling of dissipation in the entire display screen and advantageously enables the displayed information to be organized for the easier recognition.

Part of the charts CH1 to CH5 may be omitted from the display. For example, one of the accumulated number (the chart CHT1) and the production output (the chart CH2) may be selectively displayed. The other charts may be individually switched over between display and non-display, for example, in response to the operator's instruction. This enables appropriate charts to be displayed according to the purpose of display.

C. Example of Processing

The following describes the details of the processing, for example, display of the chart shown in FIG. 3, in the production efficiency improvement support system 20. The following description illustrates the configuration of performing a process afterwards by using, for example, the results of detection stored in the detection result storage unit 23. Another procedure may, however, perform each process in real time with receiving information from the production equipment 10.

Figure 5:
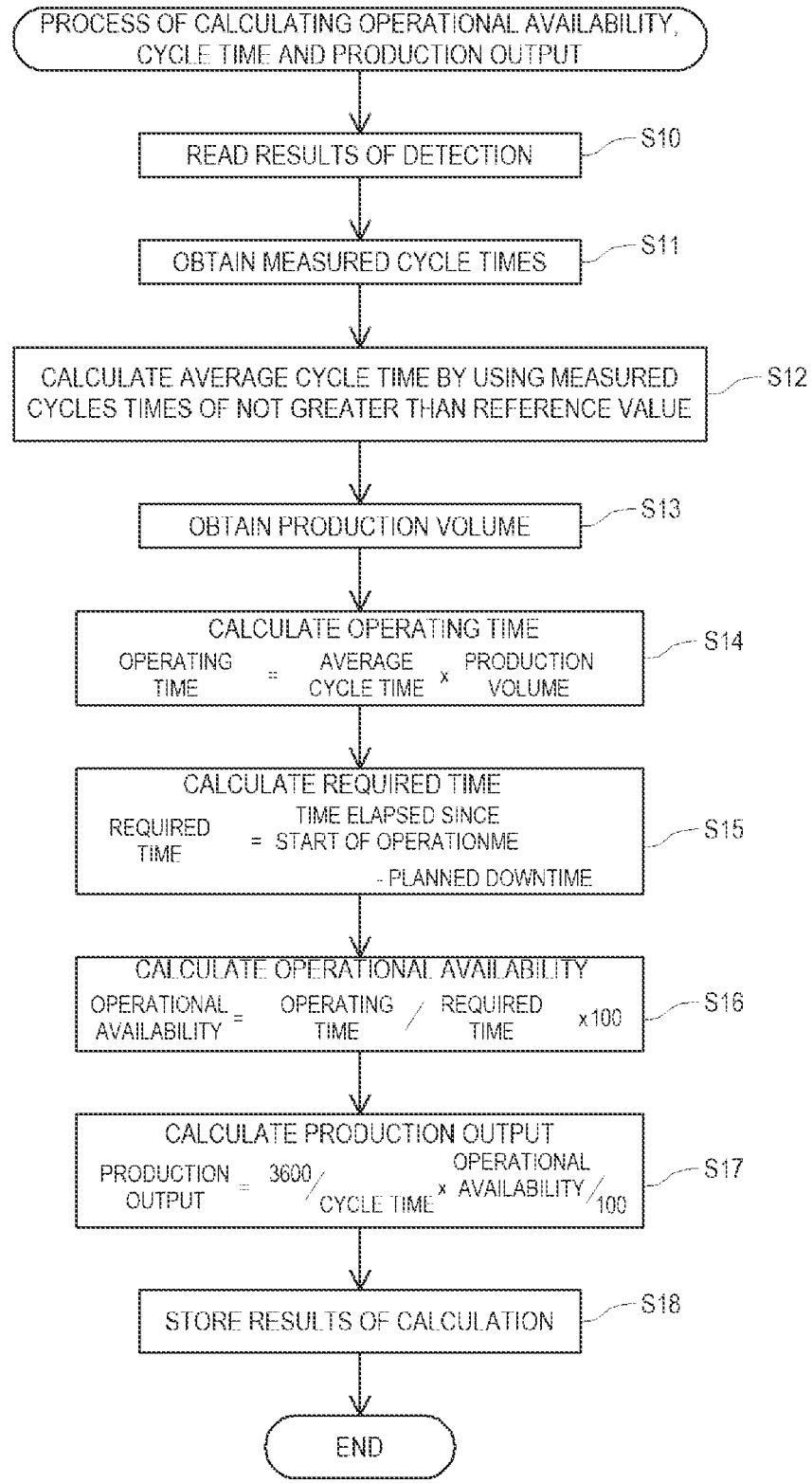
FIG. 5 is a flowchart showing a process of calculating an operational availability, a cycle time and a production output.

FIG. 5 is a flowchart showing a process of calculating the operational availability, the cycle time, and the production output. This process is mainly performed by the production management index calculator 25 shown in FIG. 1 and is performed by the CPU of the production efficiency improvement support system 20 as the hardware configuration.

When the process starts, the production efficiency improvement support system 20 reads the results of detection from the detection result storage unit 23 (step S10).

The production efficiency improvement support system 20 extracts a production completion pulse of a product from the results of detection and obtains a measured cycle time, based on the time interval of extraction of this pulse (step S11). The pulse may be extracted, for example, by using "Sensor ID" for detection of the production completion pulse. The production completion pulse is output every time the product is produced. The measured cycle time is thus obtained correspondingly every time the production completion pulse is output.

The production efficiency improvement support system 20 subsequently uses the measured cycle times of not greater than a reference value, among the obtained measured cycle times, to calculate an average cycle time (step S12). The reference value may be set in any of various ways. According to the embodiment, twice an expected cycle time set based on a mean value, a mode value or the like of the past data of the cycle time is used as the reference value. Using the measured cycle times of not greater than the reference value enables the average value to be calculated by excluding abnormally long apparent measured cycle times due to a stop of the production equipment or the like. A calculated value of the average cycle time is obtained correspondingly every time the measured cycle time is obtained.

The production efficiency improvement support system 20 subsequently obtains a production volume (step S13). The production volume is the number of products accumulated until the time when the average cycle time is calculated as described above. The production volume to be accumulated is the number of products corresponding to the measured cycle times of not greater than the reference value.

The production efficiency improvement support system 20 calculates an operating time at a time point corresponding to each of the measured cycle times, based on the values obtained as described above (step S14). The operating time is determined by average cycle time×production volume. The operating time means a time period when the production equipment actually works to produce the products. The operating time may otherwise be determined by integrating the measured cycle times of not greater than the reference value.

The production efficiency improvement support system 20 also calculates a required time (step S15). The required time means a time period when the production equipment is originally required to operate continuously. According to the embodiment, the required time is calculated by "time elapsed since start of operation−planned downtime". An example of the planned downtime is a lunch break.

The production efficiency improvement support system 20 then calculates the operational availability, based on the values obtained as described above (step S16). The operational availability is calculated by operating time/required time×100.

The production efficiency improvement system 20 also calculates a production output (step S17). The production output may be calculated by (3600/cycle time)×(operational availability/100).

The method of calculating the operational availability, the cycle time and the production output is not limited to the above method. For example, another available method may divide a running time of the production equipment into a plurality of time zones of some durations, determine a downtime when the production equipment is at stop due to some reason in each time zone, and calculate the operational availability by (duration of time zone−downtime)/(duration of time zone)×100%.

The method may also determine the production volume of the product in this time zone and calculate the cycle time by (duration of time zone−downtime)/production volume.

Any of various other methods may be employed to calculate the operational availability and the cycle time.

After calculating the operational availability, the cycle time and the production output by the above series of processing, the production efficiency improvement support system 20 stores the results of calculation (step S18) and terminates the process of calculating the operational availability, the cycle time and the production output. The calculated operational availability, the calculated cycle time and the calculated production output are used for display of the chart (shown in FIG. 3 and FIG. 4).

Figure 6:
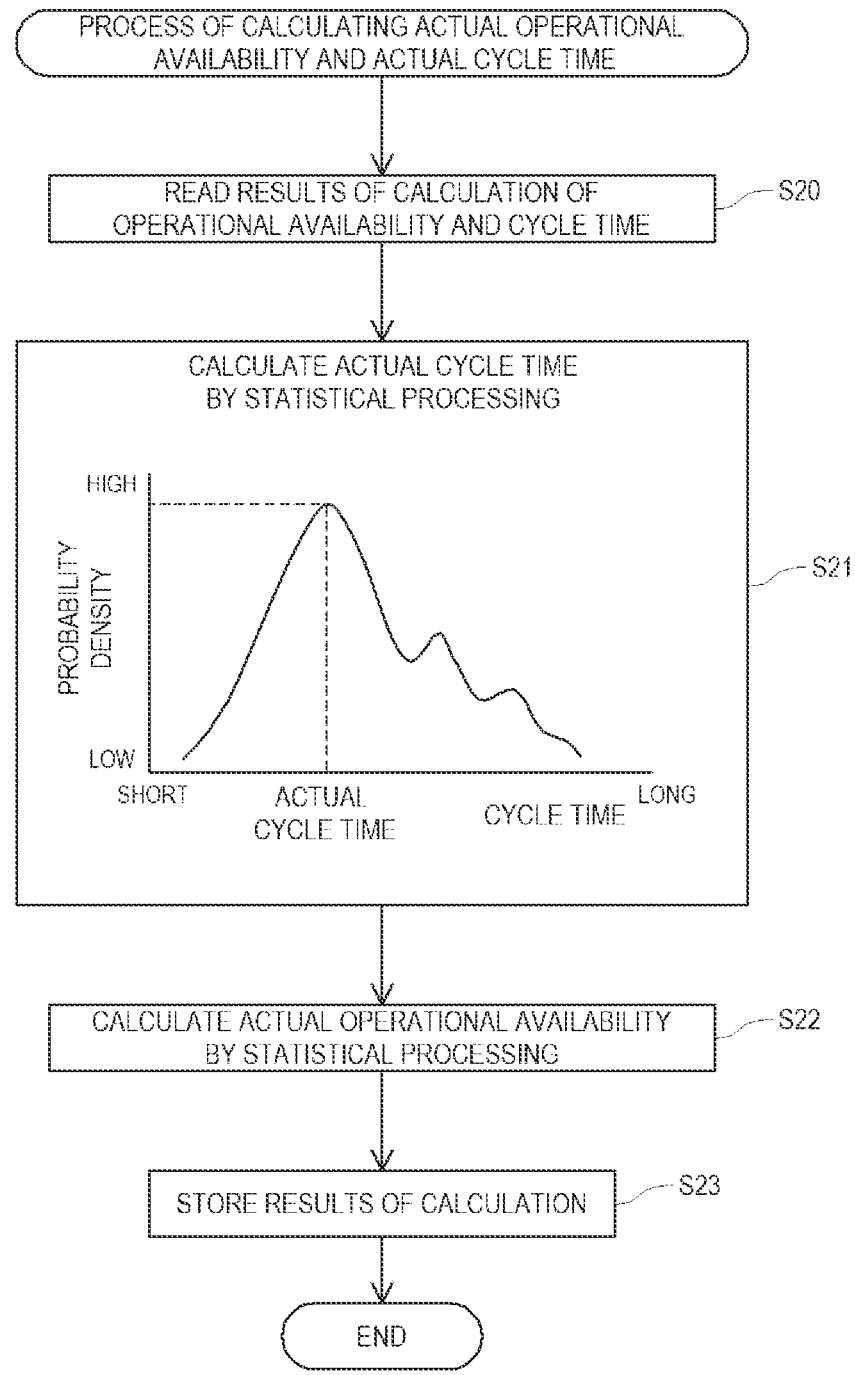
FIG. 6 is a flowchart showing a process of calculating an actual operational availability and an actual cycle time.

FIG. 6 is a flowchart showing a process of calculating the actual operational availability and the actual cycle time. This process is mainly performed by the production management index calculator 25 shown in FIG. 1 and is performed by the CPU of the production efficiency improvement support system 20 as the hardware configuration.

When the process starts, the production efficiency improvement support system 20 reads the results of calculation of the operational availability and the cycle time (step S20) and calculates the actual cycle time by statistical processing (step S21). A method of calculating the actual cycle time is shown in the flowchart.

The cycle time is varied by a variety of factors during production. A graph illustrated in the flowchart shows a probability density function when the varying cycle time is regarded as a continuous function. As illustrated, the probability density function has a maximum value at a certain cycle time. According to this embodiment, the cycle time corresponding to this maximum value is adopted as the actual cycle time. When the cycle time is regarded as discrete values, the cycle time corresponding to a maximum frequency may be adopted as the actual cycle time. When the cycle time is regarded as discrete values, however, it is preferable to limit the number of significant digits of the cycle time and perform quantization. The actual cycle time is not limited to those calculated by these methods but may be, for example, an average value or a median value.

The production efficiency improvement support system 20 subsequently calculates the actual operational availability by statistical processing (step S22). The actual operational availability is calculable by statistical processing similar to the statistical processing performed to calculate the actual cycle time. When the maximum value described above is adopted for the actual cycle time, the actual operational availability is not necessarily a maximum value but may be an average value or a median value.

After calculating the actual operational availability and the actual cycle time by the above series of processing, the production efficiency improvement support system 20 stores the results of calculation (step S23) and terminates the process of calculating the actual operational availability and the actual cycle time. The calculated actual operational availability and the calculated actual cycle time are used for display of the chart (shown in FIG. 3 and FIG. 4).

Figure 7:
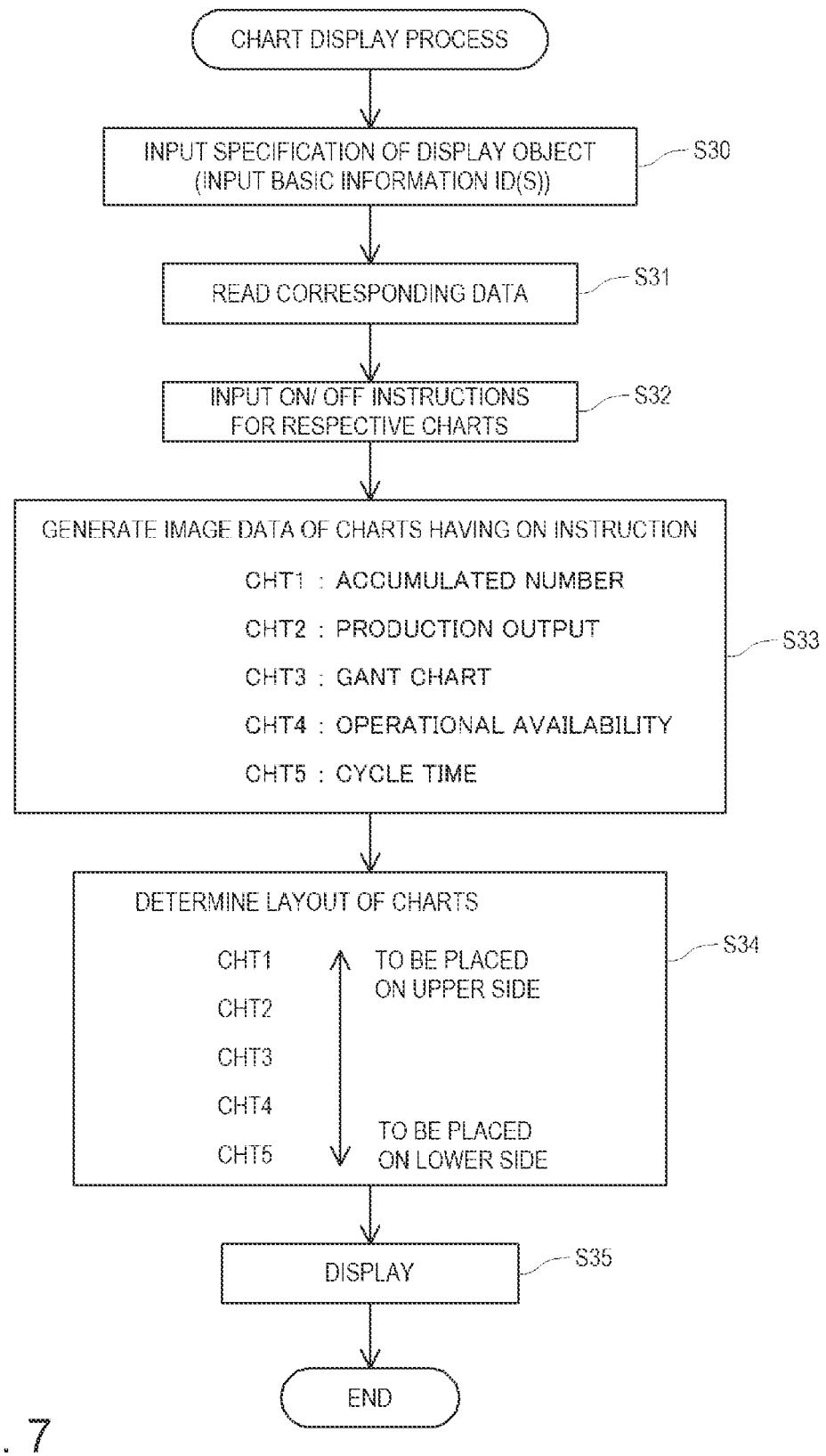
FIG. 7 is a flowchart showing a chart display process.

FIG. 7 is a flowchart showing a chart display process. This process is mainly performed by the display controller 27 shown in FIG. 1 and is performed by the CPU of the production efficiency improvement support system 20 as the hardware configuration.

When the process starts, the production efficiency improvement support system 20 inputs specification of a display object (step S30). According to the embodiment, the display information ID (shown in FIG. 2) is input. According to a modification, the production efficiency improvement support system 20 may specify the display information ID corresponding to input of information such as the date and the production line. The chart may be displayed corresponding to a plurality of basic information IDs as shown in FIG. 3, so that a plurality of the basic information IDs may be input here.

The production efficiency improvement support system 20 subsequently reads data corresponding to this basic information ID (step S31). More specifically, the production efficiency improvement support system 20 reads the results of calculation of the operational availability, the cycle time, the accumulated number and the production output and the results of calculation of the actual operational availability and the actual cycle time. Reading of the actual operational availability and the actual real time may be omitted.

The production efficiency improvement support system 20 then inputs ON/OFF instructions for the respective charts (step S32). The embodiment is configured to allow the operator to individually give ON/OFF instructions for the respective charts CHT1 to CHT5 shown in FIG. 4. After the input of the ON/OFF instructions, the production efficiency improvement support system 20 generates image data of the charts having the ON instruction (step S33), determines the layout of display (step S34) and performs display (step S35).

According to the embodiment, the charts CHT1 to CHT5 are arranged in this sequence downward. For example, when all the charts CHT1 to CHT5 have the ON instruction, the charts are displayed in the sequence of CHT1, CHT2, CHT3, CHT4 and CHT5 from the top to the bottom. When only part of the charts CHT2 and CHT5 have the ON instruction, the charts are displayed in the sequence of CHT2 and CHT5 from the top to the bottom. Displaying the charts according to the priority order in the vertical layout has the various advantages described above with reference to FIG. 4. The layout of the charts is, however, not necessarily fixed to this sequence, but the operator may be allowed to arbitrarily set the layout of the charts or allowed to change the layout of the charts after the display.

D. Advantageous Effects and Modifications

The production efficiency improvement system outputs the detected cycle time in the form of a chart that allows for recognition of a variation of the cycle time. This chart enables the operator to objectively recognize the status of the cycle time, i.e., whether the cycle time is stable or unstably varies and advantageously facilitates the operator's understanding of how to improve the cycle time with a view to improving the production efficiency. Accordingly, the configuration of the embodiment effectively supports improvement of the production efficiency.

All the various features described in the embodiment are not necessarily essential, but part of such features may appropriately be omitted or may be provided in combination with other features. The present disclosure is not limited to the above embodiment but may be configured by various other aspects.

(1) Modification 1

Figure 8:
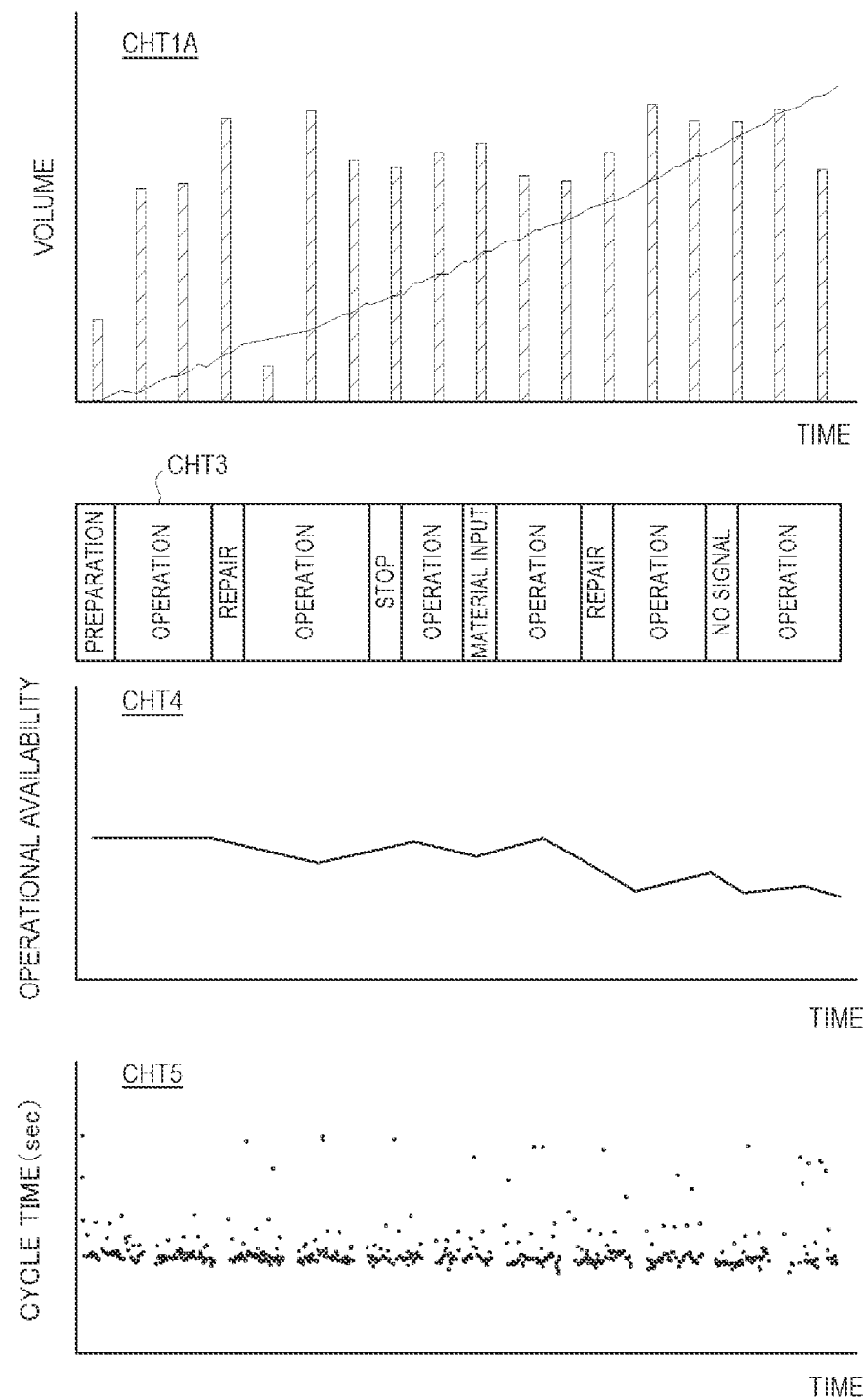
FIG. 8 is an explanatory diagram illustrating an output example of charts according to a modification.

FIG. 8 is an explanatory diagram illustrating an output example of charts according to a modification. In the embodiment (shown in FIG. 4), the chart of the accumulated number (CHT1) and the chart of the production output (CHT2) are displayed as separate charts. In the modification (shown in FIG. 8), however, both the accumulated number and the production output are displayed in an identical chart CHT1A. In this chart, a polygonal line graph shows a time series change of the accumulated number, and a histogram shows the production output. With regard to the production output, a time period after a start of operation is divided into predetermined time zones, and the production output in each time zone is displayed.

Displaying the accumulated number and the production output in one identical chart like this modification enables the operator to readily and intuitively recognize a change rate of the accumulated number and also recognize a change of the production output. This configuration has such an advantage as to provide a chart that allows for comprehensive recognition of a change in production volume.

(2) Modification 2

Figure 9:
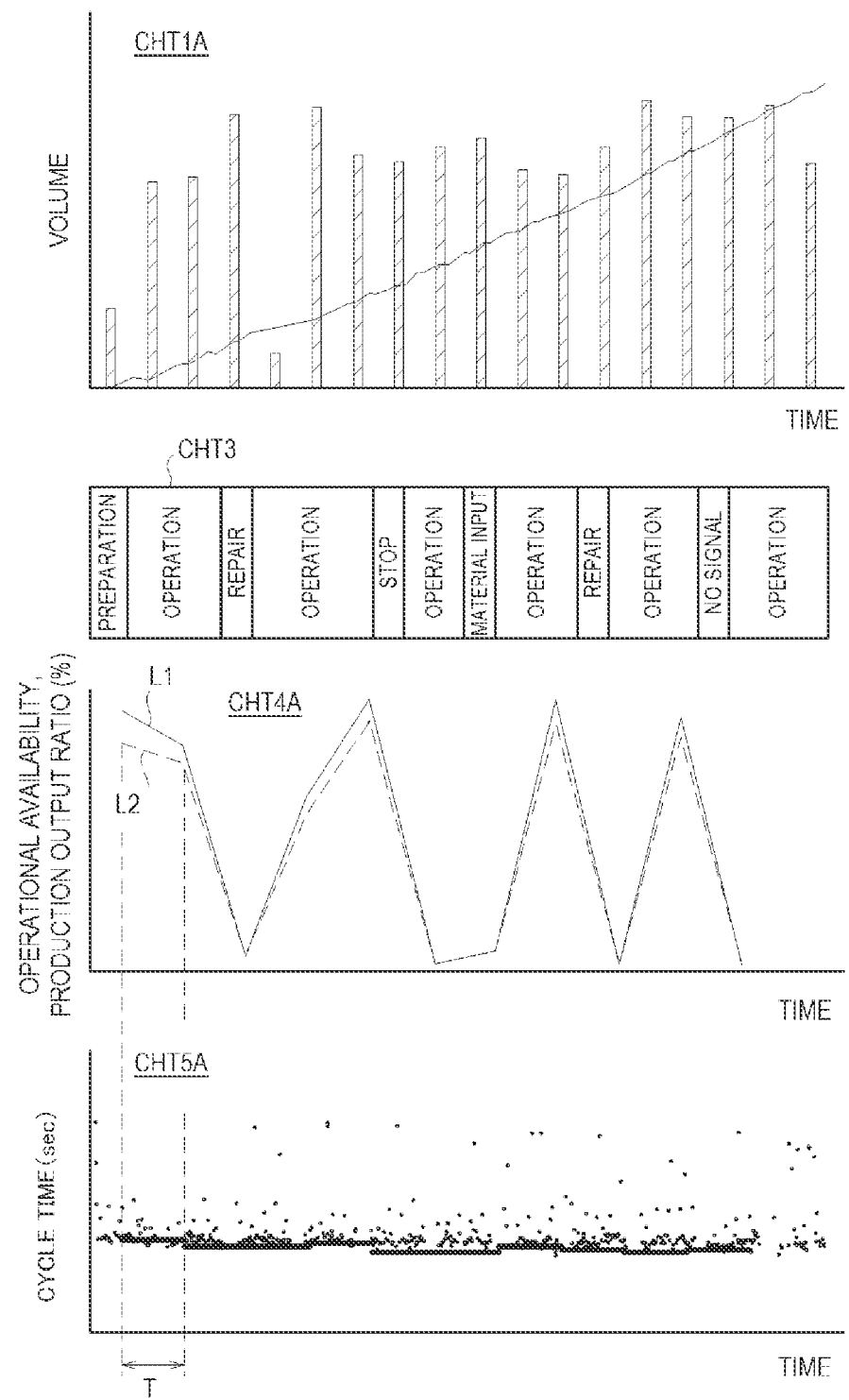
FIG. 9 is an explanatory diagram illustrating an output example of charts according to a second modification.

FIG. 9 is an explanatory diagram illustrating an output example of charts according to a second modification. The second modification displays a chart CHT4A showing a time series change of the operational availability and a time series change of a production output ratio. The production output ratio is a ratio of a production output as an actual value to an expected production output achieved by the cycle time and the operational availability as expected, i.e., an index calculated by (production output as actual value)/expected output production×100(%). A solid-line graph L1 shows a time series change of the operational availability, and a broken-line graph L2 shows a time series change of the production output ratio.

Even in the state of a high operational availability, the large cycle time provides the low production output ratio. Even in the state of a low operational availability, on the contrary, the small cycle time provides the high production output ratio. Accordingly, the production output ratio serves as an index for comprehensively evaluating the operational availability and the cycle time. In the illustrated example, the production output ratio is lower than the operational availability in a time zone T. This suggests a problem of the cycle time, i.e., a delay from a expected cycle time. Accordingly, the production output ratio is likely to be improved by eliminating the case of the delay in the cycle time.

With a view to facilitating recognition of a delay in the cycle time, the second modification additionally displays a mean cycle time in each time zone in a chart CHT5A of the time series change of the cycle time. The actual cycle time described in FIG. 6 may also be displayed. This configuration enables an overall delay of the cycle time to be confirmed in the time zone T and advantageously allows for configuration that the recognition by the comparison between the operational availability and the production output ratio is not wrong.

(3) Modification 3

As described above, the production efficiency improvement system 20 displays the time series change of the cycle time in such a form as to allow for easy recognition of the operating status of the production equipment. When the requirement for some improvement is found based on such a form of the display, the production efficiency improvement system 20 may be configured to perform display to support the improvement. One example of the display is an accumulated downtime chart described below.

Figure 10:
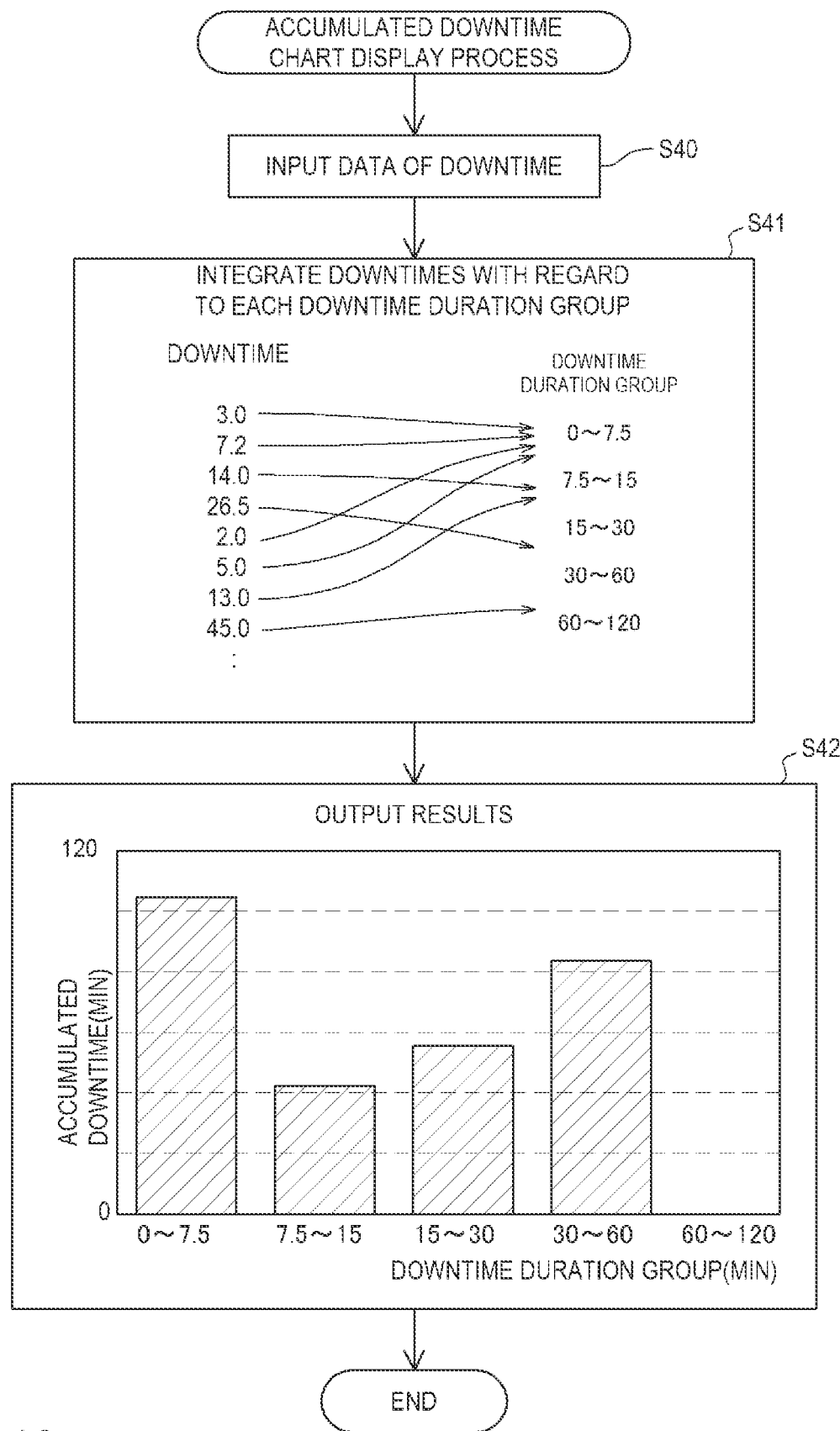
FIG. 10 is a flowchart showing an accumulated downtime chart display process.

FIG. 10 is a flowchart showing an accumulated downtime chart display process. This process is mainly performed by the production management index calculator 25 and the display controller 27 shown in FIG. 1 and is performed by the CPU of the production efficiency improvement support system 20 as the hardware configuration.

When the process starts, the production efficiency improvement system 20 inputs data of the downtime (step S40) and integrates the downtimes with regard to each downtime duration group (step S41).

A method of integration is illustrated in the flowchart. In this example, the downtime duration groups are set as 0 to 7.5 minutes, 7.5 to 15 minutes, 15 to 30 minutes, 30 to 60 minutes, and 60 to 120 minutes.

The input data of downtime are shown on the left side. The production equipment may stop due to various factors during production. The data of downtime shown on the left side are time series input data of durations during which the production equipment is at stop. The processing of step S41 allocates each of the downtimes shown on the left side to one of the downtime duration groups shown on the right side as shown by each arrow. For example, the first downtime is 3 minutes and is thus allocated to the downtime duration group of 0 to 7.5 minutes. The third downtime is 14 minutes and is thus allocated to the downtime duration group of 7.5 to 15 minutes. The downtimes allocated to the respective downtime duration groups are then integrated individually with regard to each downtime duration group. The production efficiency improvement support system 20 accordingly obtains the accumulated downtime with regard to each downtime duration group.

The production efficiency improvement system 20 then outputs the obtained results (step S42). An output chart is shown in the flowchart. According to the embodiment, a format of histogram is adopted to show the accumulated downtimes with regard to the respective downtime duration groups. It is understood from this chart that the downtime duration group of 0 to 7.5 minutes has the highest accumulated downtime. Although each downtime is short in the downtime duration group of 0 to 7.5 minutes, the frequent stops result in increasing the accumulated downtime. This suggests that eliminating the causes of the stops corresponding to this downtime duration group efficiently reduces the accumulated downtime and contributes to improvement of the production efficiency.

In a configuration of outputting only the downtime of the production equipment, an event having a long downtime, for example, an event corresponding to the downtime duration group of 30 to 60 minutes, is likely to draw attention. The configuration of this embodiment, however, displays the accumulated downtime and thereby draws attention to the cause of the stop that is to be eliminated.

Any of various formats may be used for the chart as long as the format allows for comparison among the accumulated downtimes of the respective downtime duration groups.

The downtime duration groups are not limited to the illustrated example but may be set arbitrarily. The duration of the downtime duration group may be fixed or may differ among the respective downtime duration groups. It is not necessary that the downtime duration group is unequivocally mapped to the cause of the stop of the production equipment. A configuration of setting the downtime duration group to be mapped to the expected cause of the stop as unequivocally as possible by taking into account the relationship between the expected cause of the stop and the resulting downtime has such an advantage as to relatively readily find a countermeasure for eliminating the cause of the stop.

The present disclosure is applicable to support improvement of the production efficiency in production equipment used to produce a product.

What is claimed is:

1. A production efficiency improvement support system for supporting improvement of production efficiency in production equipment used to produce a product, the production efficiency improvement support system comprising:
    a production management index calculator configured to calculate a cycle time, which is a time period required to produce the product, to obtain a calculated cycle time multiple times during operation of the production equipment, based on results of detection obtained by detecting an operating status of the production equipment, and to calculate an effective cycle time as a representative value of a plurality of calculated cycle times by statistically processing the plurality of calculated cycle times; and
    a display controller configured to display a chart showing a time series variation of the calculated cycle time and the effective cycle time, such that a variation of the calculated cycle time is visually recognizable relative to the effective cycle time.

2. The production efficiency improvement support system according to claim 1,
    wherein the display controller is configured to display the calculated cycle time with a symbol.

3. The production efficiency improvement support system according to claim 1,
    wherein the production management index calculator further configured to calculate an operational availability that is a ratio of time during which the production equipment is operating and a production volume of the product, multiple times during operation of the production equipment, based on the results of detection obtained by detecting the operating status of the production equipment; and
    wherein the display controller is further configured to display a time series variation of the operational availability and a time series variation of the production volume, as well as the time series variation of the cycle time to be aligned with an identical time axis in the chart.

4. The production efficiency improvement support system according to claim 3,
    wherein the display controller is configured to display a time series variation of an accumulated number of the products and a production output with regard to each of predetermined time duration groups in an identical chart, as the production volume.

5. The production efficiency improvement support system according to claim 3,
    wherein the display controller is configured to display the chart in such an arrangement that the production volume is placed on an upper side of the chart and the operational availability and the cycle time are placed on a lower side of the chart.

6. The production efficiency improvement support system according to claim 5,
    wherein the display controller is configured to display information showing whether the production equipment is in operation or not in operation at each time, to be placed between the production volume and the operational availability with the cycle time, in the chart.

7. The production efficiency improvement support system according to claim 1,
    wherein the production management index calculator further configured to display a time series variation of an operational availability that is a ratio of time during which the production equipment is operating and a time series variation of a production output ratio that is a ratio of an actual production output to an expected production output, in an identical chart, based on the results of detection obtained by detecting the operating status of the production equipment.

8. The production efficiency improvement support system according to claim 1,
    wherein the display controller is further configured to, in response to specification of any point in the chart by an operation of a pointing device, open a pop-up window so as to display detailed information on the operating status corresponding to the specified point.

9. The production efficiency improvement support system according to claim 1,
    wherein the display controller is further configured to highlight any cycle time determined as abnormal.

10. The production efficiency improvement support system according to claim 1, wherein:
    the production management index calculator is further configured to refer to results of detection obtained by detecting an operating status of the production equipment, the results of detection including downtimes of the production equipment, and to calculate an accumulated downtime with regard to each of a plurality of downtime duration groups, the downtime duration groups having been set in advance according to durations of the downtime; and
    the display controller is further configured to display a chart showing the accumulated downtime with regard to each of the downtime duration groups.

11. A production efficiency improvement support method implemented in a computer, for supporting improvement of production efficiency in production equipment used to produce a product, the production efficiency improvement support method comprising, as steps performed by the computer:
    reading results of detection obtained by detecting an operating status of the production equipment;
    calculating a cycle time that is a time period required to produce the product, multiple times during operation of the production equipment, based on the results of detection; and
    displaying a chart showing a time series variation of the calculated cycle time in such a state that a variation of the calculated cycle time is visually recognizable.

12. The production efficiency improvement support method according to claim 11, further comprising:

referring to results of detection obtained by detecting an operating status of the production equipment including downtimes of the production equipment;

calculating an accumulated downtime with regard to each of a plurality of downtime duration groups, the downtime duration groups having been set in advance according to duration of the downtime; and displaying a chart showing the accumulated downtime with regard to each of the downtime duration groups.

13. A non-transitory computer-readable storage medium with an executable program stored thereon, wherein the program instructs a microprocessor to perform the production efficiency support method according claim 11.

14. A non-transitory computer-readable storage medium with executable program stored thereon, wherein the program instructs a microprocessor to perform the production efficiency support method according to claim 12.

* * * * *